(12) United States Patent
Lewis

(10) Patent No.: US 8,262,091 B2
(45) Date of Patent: Sep. 11, 2012

(54) SCARF CUT BACKUP RINGS

(75) Inventor: Steven Alan Lewis, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 574 days.

(21) Appl. No.: 12/201,657

(22) Filed: Aug. 29, 2008

(65) Prior Publication Data

US 2010/0052259 A1    Mar. 4, 2010

(51) Int. Cl.
F16J 9/14      (2006.01)
F16J 15/00    (2006.01)

(52) U.S. Cl. ......... 277/496; 277/546; 277/584; 277/631

(58) Field of Classification Search .......... 277/496–499, 277/546, 584, 631
See application file for complete search history.

(56) References Cited

U.S. PATENT DOCUMENTS

| | | | |
|---|---|---|---|
| 1,369,104 A * | 2/1921 | Hendrickson | 277/497 |
| 3,300,225 A | 1/1967 | Shepler | |
| 3,582,093 A * | 6/1971 | Lucien | 277/434 |
| 4,027,816 A | 6/1977 | Slator et al. | |
| 4,288,082 A | 9/1981 | Setterberg, Jr. | |
| 4,468,041 A | 8/1984 | Yoshimura et al. | |
| 4,840,379 A | 6/1989 | Thoman, Jr. | |
| 5,131,666 A | 7/1992 | Hutchens | |
| 5,275,422 A | 1/1994 | Rehfeld | |
| 5,617,918 A | 4/1997 | Cooksey et al. | |
| 6,173,968 B1 * | 1/2001 | Nelson et al. | 277/619 |
| 6,832,671 B1 | 12/2004 | Stafford | |
| 2005/0023828 A1 | 2/2005 | Takeuchi et al. | |
| 2007/0052181 A1 * | 3/2007 | Nakamura | 277/584 |

FOREIGN PATENT DOCUMENTS

EP    0483097 A1    4/1992

OTHER PUBLICATIONS

EP Search Report dated Jan. 4, 2010, EP 09168628.7-1252.

\* cited by examiner

*Primary Examiner* — Vishal Patel
(74) *Attorney, Agent, or Firm* — Ingrassia Fisher & Lorenz, P.C.

(57) ABSTRACT

A seal assembly is provided for sealing a gap with a high pressure side and a low pressure side between a first component and a second component. The seal assembly can include a primary seal configured to be arranged on the first component and spanning the gap on the high pressure side between the first and second component; and a backup ring configured to be arranged on the first component adjacent the primary seal on the low pressure side. The backup ring includes an inner diameter and a scarf cut slit at an angle that is a function of the inner diameter of the backup ring.

10 Claims, 3 Drawing Sheets

SCARF CUT BACKUP RINGS

TECHNICAL FIELD

The present invention generally relates to backup rings in sealing assemblies, and more particularly relates to improved scarf cut backup rings.

BACKGROUND

Most hydraulic or pneumatic systems employ elastomeric and/or plastic seals to prevent or control the flow of fluid through the clearance between two closely fitted surfaces. The sealed surfaces can be generally cylindrical surfaces, such as a piston and cylinder combination, a piston rod and rod guide combination, or a rotating shaft and housing combination. Additionally, the closely fitted surfaces may be static or dynamic with respect to each other, either in the axial or circumferential direction.

One type of seal used in seal assemblies is an O-ring. In general, the O-ring is installed in a machined groove extending into one of the two surfaces to be sealed. Typically, the cross section of the O-ring is at least slightly larger than the cross section of the receiving groove such that when the two surfaces are brought together, a portion of the cross section of the O-ring is squeezed, thereby absorbing the tolerance backup between the surfaces.

In relatively low pressure applications (i.e., when the fluid being sealed exerts little or no pressure or force on the seal), as the O-ring is squeezed, the O-ring exerts a return force against the mating surface and the groove. In this manner, the O-ring firmly contacts both the mating surface and the groove to create a barrier for blocking the passage of fluid between the surfaces. For applications in which higher pressures are exerted on the O-ring, the sealing force of the squeezed O-ring is augmented by the system fluid pressure. In some conventional applications, one or more generally rigid backup rings (or "anti-extrusion rings") are provided to support the O-ring, particularly to prevent the softer elastomeric O-ring from being damaged as a result of its being forced or extruded into the clearance between the sealed surfaces.

To facilitate the installation of the backup ring into a typical seal groove, the backup ring is commonly split or cut completely through at one place along its circumference. Of course, once the backup ring is cut, it no longer provides a complete circumferential plane of protection for the O-ring. As a result, many conventional backup rings tend to separate at the split, particularly in high pressure applications, thereby permitting the softer O-ring to extrude into the resulting gap in the backup ring and possibly causing deterioration.

Accordingly, it is desirable to provide a seal assembly with a backup ring of a simple design that is effective for a variety of different sealing applications, including high pressure applications. It is further desirable to provide backup rings that more effectively prevent deterioration and/or extrusion of the O-rings. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a seal assembly is provided for sealing a gap with a high pressure side and a low pressure side between a first component and a second component. The seal assembly can include a primary seal configured to be arranged on the first component and spanning the gap on the high pressure side between the first and second component; and a backup ring configured to be arranged on the first component adjacent the primary seal on the low pressure side. The backup ring includes an inner diameter and a scarf cut slit at an angle that is a function of the inner diameter of the backup ring.

In accordance with another exemplary embodiment, a backup ring is mounted between a primary seal used for sealing an annular gap and a low pressure side sidewall of a mounting groove. The backup ring includes a ring portion with a planar top side and a planar bottom side; and a scarf cut slit formed through the ring portion with an angle of less than 20° relative to the planar top side.

In accordance with yet another exemplary embodiment, a method of manufacturing a backup ring for installation on a first component includes determining an outer diameter of the first component; and forming the backup ring with an inner diameter greater than the outer diameter of the first component.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein provide a sealing assembly with a backup ring having a scarf cut slit at a smaller angle than conventional backup rings. The parameters of the scarf cut slit can be determined as a function of the diameter backup ring and/or the circumferential length. Additionally, the backup ring can be manufactured with slightly larger diameter than the component on which it is mounted. As such, when installed, the backup ring may have some amount of overlap. These characteristics may prevent a gap from forming at the scarf cut slit and provide improved support to the O-ring during operation.

Figure 1:
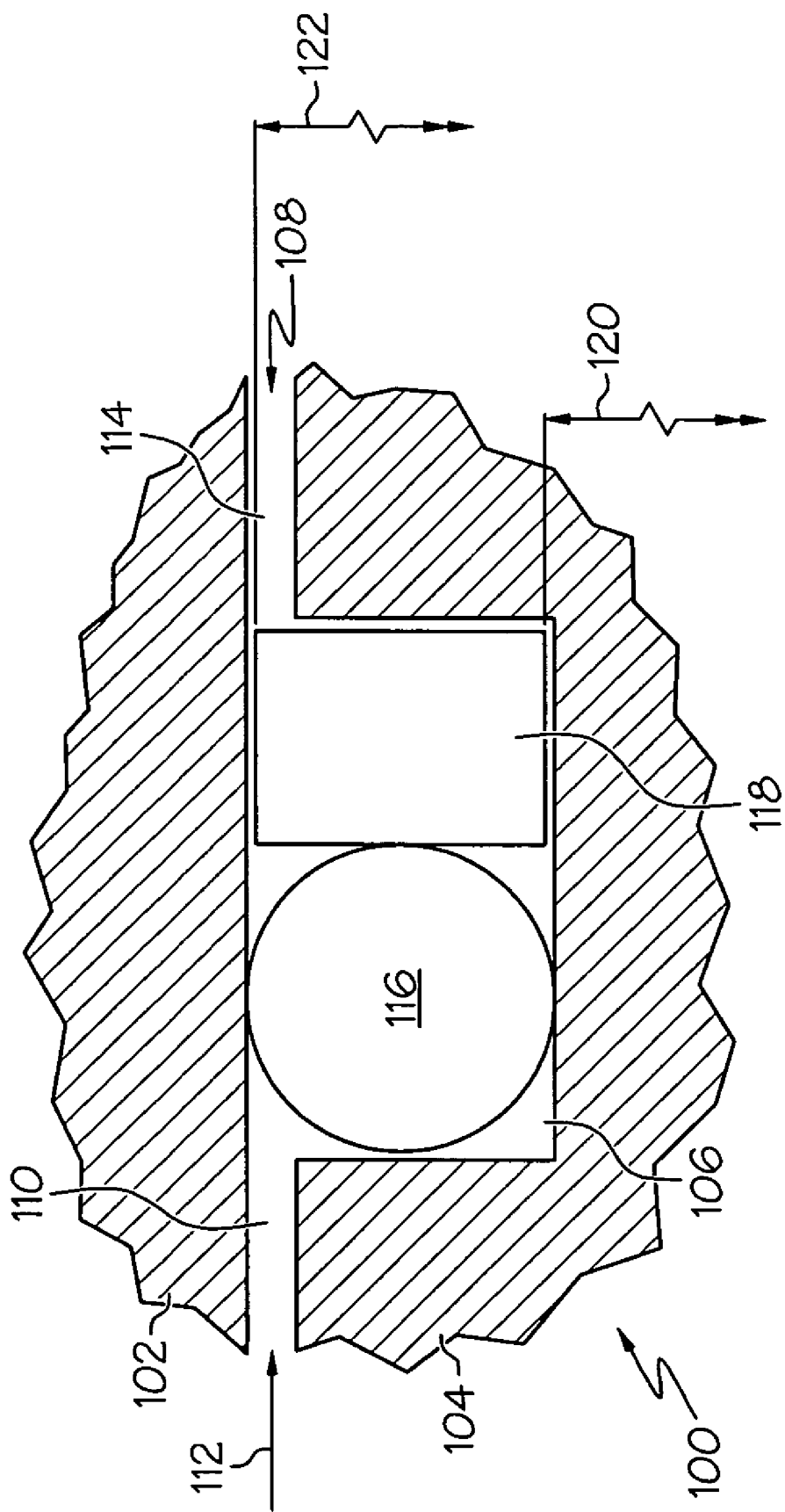
FIG. 1 is a cross-sectional view of a seal assembly in accordance with an exemplary embodiment between two components.

FIG. 1 is a cross-sectional view of a seal assembly 100 between two components 102, 104 in accordance with an exemplary embodiment. Generally, the two sealed components 102, 104 include a first component 102 and a second component 104. The components 102, 104 can be any two components between which a seal is desired. Examples include a piston and cylinder combination, piston rod and rod guide combination, a rotating shaft and its surrounding housing, components of a valve assembly, components of an actuator assembly, and components within a fuel pump. In this exemplary embodiment, the two components 102, 104 are used in a high-pressure application, such as for example, applications in which the pressure exceeds about 1000 psi or so, although other embodiments may be used with any applied pressure or other parameters. Some exemplary applications include, for example, high pressure turbine engine fuel and hydraulic systems, aircraft hydraulic systems, and high pressure industrial equipment.

The second component 104 defines a groove 106 in which the seal assembly 100 is arranged to seal a gap 108 between the first and second components 102, 104. In the depicted embodiment, the gap 108 has a high pressure side 110 on which a liquid or gas flow 112 exerts pressure on the seal assembly 100 and a downstream, low pressure side 114. In an alternate embodiment, no groove 106 is present, and the seal assembly is mounted directly between the first and second components 102, 104. In this embodiment, the second component 104 is generally cylindrical, thereby resulting in the seal assembly 100 generally having the shape of a ring, as discussed in further detail below.

The seal assembly 100 includes a primary seal, which in this exemplary embodiment is an O-ring 116, and a secondary seal, which in this exemplary embodiment is a backup ring 118. The O-ring 116 has a generally circular cross-sectional shape, as shown, but can have any suitable shape, such as for example, a square shape, radiused profile, rectangular profile, trapezoidal and/or wedge configuration. The O-ring 116 is mounted on the high pressure side 110 in the groove 106, and the backup ring 118 is mounted on the low pressure side 114 of the groove 106 adjacent the O-ring 116. The backup ring 118, as shown, has a generally square cross-sectional area, but can have any suitable shape, such as for example, a circular, radiused profile, rectangular profile, trapezoidal and/or wedge configuration.

To facilitate installation, the backup ring 118 may include a slit such that first and second portions of the backup ring 118 can be separated to wrap the backup ring 118 around the second component 104. This slit is discussed in greater detail below with reference to FIGS. 2-4.

The O-ring 116 is typically manufactured from an elastomer or similar material to deform at least slightly relative to the first and second components 102, 104. This deformation enables a tight seal. Considerations for choosing the material of the O-ring 116 include compatibility with the liquid or gas flow 112, the clearance of the gap 108, and the use conditions of the first and second components 102, 104. Some typical materials from the O-ring 116 materials include fluorosilicone, fluorocarbon, and nitrile. The backup ring 118 is typically manufactured from a harder material than that of the O-ring 116. In one exemplary embodiment, the backup ring 118 can be, for example, Polytetrafluoroethylene, which is sold commercially as TEFLON by the du Pont de Nemours Company. Other exemplary materials, including filled TEFLON, polyamides, thermoplastics, fluorocarbon, and the like may also be used. At high temperatures and/or pressures, the mechanical properties of O-ring 116 may be modified, in particular modulus of elasticity, resistance to creep, and resistance to abrasion. The backup ring 118 supports the O-ring 116 and prevents the O-ring 116 from protruding into the gap 108 and being damaged, particularly during high pressure applications.

Figure 2:
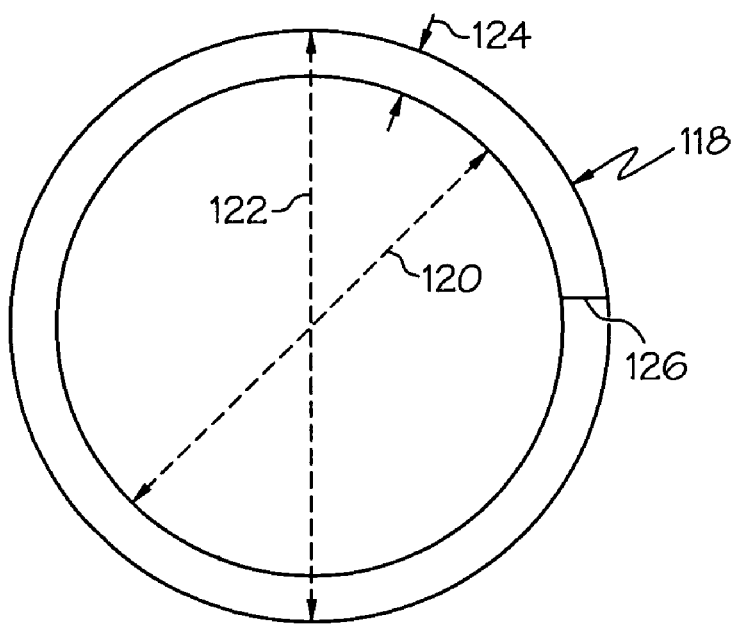
FIG. 2 is a top view of an exemplary backup ring of the seal assembly of FIG. 1.

FIG. 2 is a top view of an exemplary backup ring, such as for example, the backup ring 118 of the seal assembly 100 of FIG. 1. As discussed above, the backup ring 118 in this exemplary embodiment is ring-shaped and further includes an inner diameter 120, an outer diameter 122, and the planar thickness 124. FIG. 2 additionally shows the circumferential position of a slit 126 formed in the backup ring 118, which will now be discussed in further detail with reference to FIG. 3.

Figure 3:
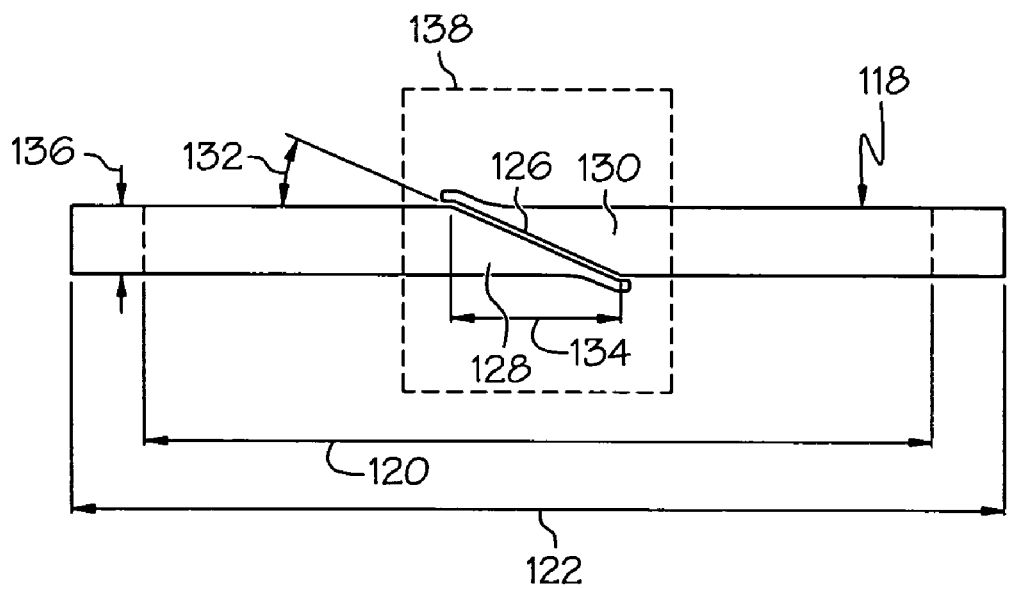
FIG. 3 is a side view of the exemplary backup ring of FIG. 2.

FIG. 3 is a side view of the exemplary backup ring 118 ring of FIG. 2. As discussed above, the slit 126 enables the backup ring 118 to separate at first and second portions 128, 130 to facilitate installation. The slit 126 additionally enables a degree of freedom to permit expansion and contraction of the backup ring 118 during operation. With this in mind, the slit 126 is provided with a "scarf" cut at an angle 132 relative to a planar surface (e.g., surface 144) to permit some degree of expansion without the backup ring 118 completely separating. In other words, if the angle 132 of the slit 126 is 90°, any amount of expansion of the backup ring 118 would cause the first and second portions 128, 130 to separate, thereby leaving the O-ring 116 unsupported at that position. Additionally, in some instances, the O-ring 116 may attempt to extrude into the slit within the backup ring 118 if the ends separate.

In many applications, the angle 132 of the slit 126 is about 20°. In other applications with smaller components, the angle 132 of the slit 126 is about 45°. In this exemplary embodiment, the angle 132 can be a function of the inner diameter 120 of the backup ring 118, or in other embodiments, the angle 132 can be a function of the outer diameter 122. As the angle 132 of the slit 126 decreases, the circumferential length 134 of the slit 126 correspondingly increases. A greater circumferential length 134 of the slit 126 advantageously enables larger relative movement between the first and second portions 128, 130 of the backup ring 118 without the backup ring 118 completely separating. From this perspective, it is beneficial for angle 132 of the slit 126 to be as small as possible. In accordance with one embodiment, the angle 132 can be less than about 20°, such as for example, about 15°, 11°, of 6°. Other suitable angles 132 may alternatively be employed.

Although it is beneficial for the angle 132 to be small and the circumferential length to be large from an expansion perspective, it may also beneficial for the circumferential length 134 of the slit 126 to be only a certain percentage of the entire circumference of the backup ring 118, which of course, is determined by the inner and outer diameter 120, 122. This is because, when the backup ring 118 is extended during use, and the first and second portions 128, 130 slide away from one another, the thickness 136 of the backup ring 118 at the slit 126 is decreased, and as a result, is not typically as effective as the other portions. This will generally result in concave portion at the slit 126 with a reduced thickness 136. As such, in accordance with exemplary embodiments, the angle 132 of the slit 126 is varied for small diameters 120 below about 0.7 inches to insure a circumferential slit length 134 of less than about 32% of the circumference while maintaining a minimum a slit length 134 of greater than about 5% of the circumference. Larger diameter 120 rings greater than about 0.7 inches vary the angle 132 to maintain a circumferential slit length 134 between 4% and 8% of the circumference, although generally any angle can be provided based on the circumference and conditions.

In many conventional sealing assemblies, the backup rings are manufactured with an inner diameter that corresponds to the outer diameter of the component on which it is mounted. At best, this results in a backup ring that is exactly the same size as the component is mounted. It is more likely, however, that the backup ring is actually smaller than the component since a portion of the backup ring is removed when the slit is made. As such, in many conventional sealing assemblies, even before operation, the backup ring is slightly extended at the slit, thus resulting in a reduced thickness at the slit. Additionally, the component may tend to expand during operation, further extending the backup ring and potentially causing separation.

Figure 4:
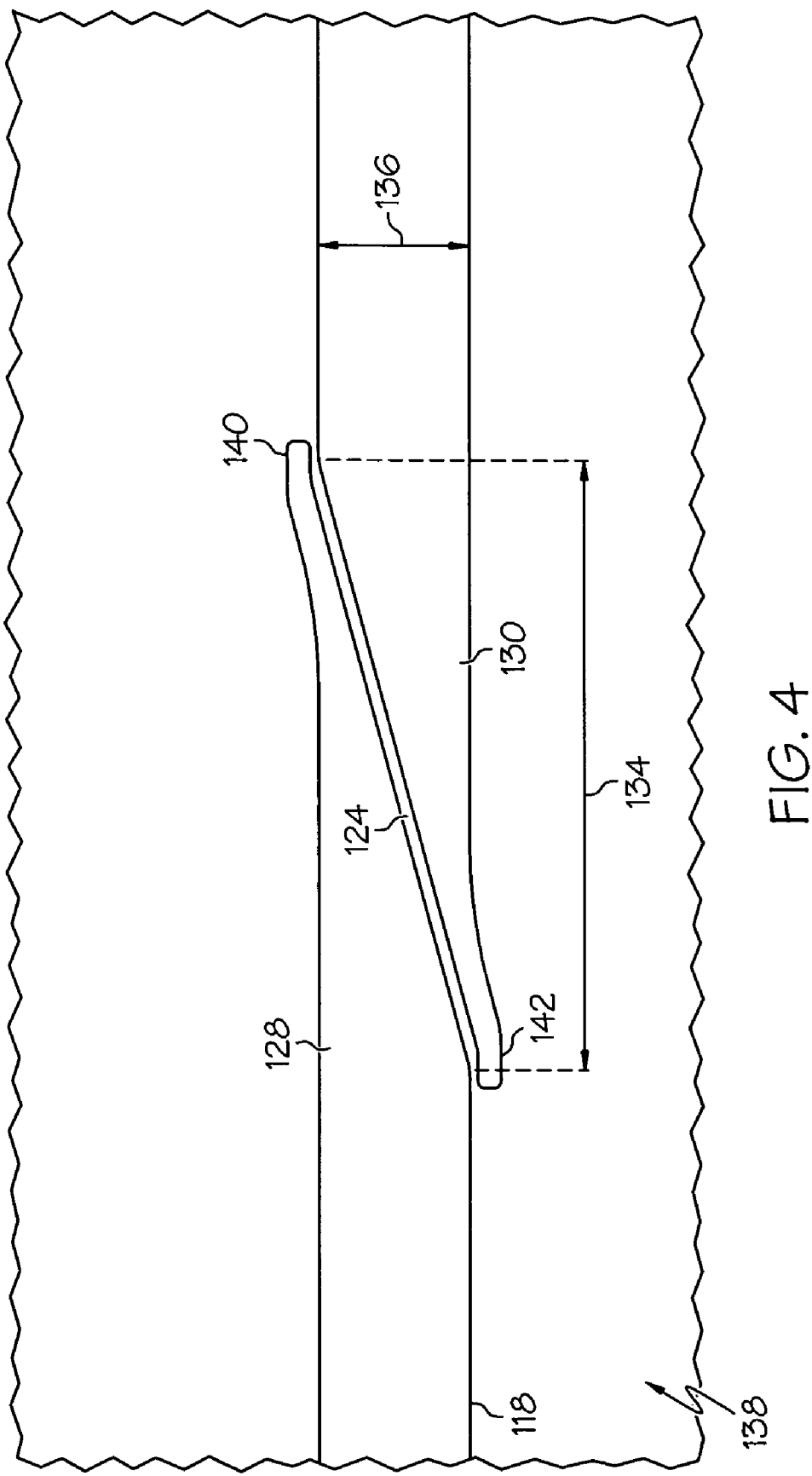
FIG. 4 is a closer side view of a portion of the exemplary backup ring of FIG. 3.

FIG. 4 is a closer side view of a section 138 of the exemplary backup ring 118 of FIG. 3. In accordance with an exemplary embodiment, the backup ring 118 is manufactured to have a slightly larger inner diameter 120 (FIG. 2) than the component on which it is mounted. This is most clearly depicted in FIG. 4 in which a first end 140 of the first portion 128 and a second end 142 of the second portion 130 extend beyond the circumferential length 134 of the slit 126. In this way, the backup ring 118 overlaps itself and has a greater thickness 136 at the first and second ends 140, 142. During operation, the backup ring 118 may expand such that the first and second ends 140, 142 correspond with the circumferential length 134 of the slit 126. In this condition, there is little or no reduction in thickness 136 of the backup ring 118 at the slit 126, even during operation. Even if there is a reduction in thickness 136, it is generally less than it would be otherwise in seal assemblies that are manufactured to the match the diameter of the component.

In one embodiment, the outer diameter 122 (FIG. 2) of the backup ring 118 is about 0.005 inches greater than the outer diameter of the second component 104 (FIG. 1) to compensate for manufacturing and assembly tolerances that would result in a reduction in the full overlap of the ends 140, 142 to less than the full circumferential length 134 of the slit 126. The additional material provided by the 0.005 inches greater outer diameter results in full overlap of the ends 140, 142 and full thickness 136 at the slit at pressurized operating position. The manufacturing and assembly tolerances increase as the diameter 120 increases, therefore a larger diameter 120 requires a larger addition to the manufactured inner diameter 120 of the backup ring. For example, a 2 inch outer diameter of component 104 may include an about 0.02 inch addition to the outer diameter 122 of the backup ring to result in full over lap of the ends 140, 142 in the pressurized operating position. Any suitable additional increase in diameter 122 can be provided, including 0.01 inches and 0.015 inches. (FIG. 1).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A seal assembly for sealing a gap with a high pressure side and a low pressure side between a first component and a second component, the seal assembly comprising:
    a primary seal configured to be arranged on the first component and spanning the gap on the high pressure side between the first and second component; and
    a backup ring configured to be arranged on the first component adjacent the primary seal on the low pressure side, the backup ring having an inner diameter and including a scarf cut slit at an angle that is a function of the inner diameter of the backup ring, wherein the backup ring has a first diameter in a first operating condition and a second, expanded diameter during a second operating condition, the backup ring having a first overlapping end portion and a second overlapping end portion during the first operating condition, wherein the slit has a circumferential length and the backup ring has an overall circumference, the slit circumferential length being no more than about 32% and no less than about 5% of the overall circumference, wherein the backup ring has a diameter less than about 0.7 inches.

2. The seal assembly of claim 1, wherein the angle is less than 20° relative to a planar surface of the backup ring.

3. The seal assembly of claim 1, wherein the angle is less than approximately 15° relative to a planar surface of the backup ring.

4. The seal assembly of claim 1, wherein the angle is less than approximately 11° relative to a planar surface of the backup ring.

5. The seal assembly of claim 1, wherein the angle is less than approximately 6° relative to a planar surface of the backup ring.

6. The seal assembly of claim 1, wherein the backup ring has a constant thickness at the slit during the second operating condition.

7. The seal assembly of claim 1, wherein the backup ring additionally has an outer diameter, the scarf cut extending in a radial direction from the inner diameter to the outer diameter.

8. The seal assembly of claim 1, wherein the backup ring includes a planar top side and a planar bottom side; and wherein the angle of the scarf cut slit is less than 20° relative to the planar top side.

9. The seal assembly of claim 1, wherein the primary seal and the backup ring are configured to seal the gap at pressures exceeding 1000 psi.

10. A seal assembly for sealing a gap with a high pressure side and a low pressure side between a first component and a second component, the seal assembly comprising:
    a primary seal configured to be arranged on the first component and spanning the gap on the high pressure side between the first and second component; and
    a backup ring configured to be arranged on the first component adjacent the primary seal on the low pressure side, the backup ring having an inner diameter and including a scarf cut slit at an angle that is a function of the inner diameter of the backup ring, wherein the backup ring has a first diameter in a first operating condition and a second, expanded diameter during a second operating condition, the backup ring having a first overlapping end portion and a second overlapping end portion during the first operating condition, wherein the slit has a circumferential length and the backup ring has an overall circumference, the slit circumferential length being no more than 8% and no less than 4% of the overall circumference, wherein the backup ring has a diameter greater than about 0.7 inches.

* * * * *